United States Patent
Sharma et al.

(10) Patent No.: US 10,482,074 B2
(45) Date of Patent: Nov. 19, 2019

(54) SYSTEM AND METHOD FOR CLASSIFYING DATA WITH RESPECT TO A SMALL DATASET

(71) Applicant: Wipro Limited, Bangalore (IN)

(72) Inventors: Mohit Sharma, Bangalore (IN); Raghottam Mannopantar, Bangalore (IN)

(73) Assignee: Wipro Limited, Bangalore (IN)

( * ) Notice: Subject to any disclaimer, the term of this patent is extended or adjusted under 35 U.S.C. 154(b) by 495 days.

(21) Appl. No.: 15/084,172

(22) Filed: Mar. 29, 2016

(65) Prior Publication Data
US 2017/0277736 A1    Sep. 28, 2017

(30) Foreign Application Priority Data

Mar. 23, 2016    (IN) .............................. 201641010247

(51) Int. Cl.
*G06F 17/30*  (2006.01)
*G06F 16/22*  (2019.01)

(52) U.S. Cl.
CPC ................................ *G06F 16/2246* (2019.01)

(58) Field of Classification Search
CPC ......... G06F 17/30707; G06F 17/30598; G06F 17/30616; G06F 17/30327
USPC .................................................. 707/740, 739
See application file for complete search history.

(56) References Cited

U.S. PATENT DOCUMENTS

| | | | |
|---|---|---|---|
| 6,571,240 B1 | 5/2003 | Ho et al. | |
| 6,675,159 B1* | 1/2004 | Lin .................... | G06F 17/2705 |
| 7,043,476 B2 | 5/2006 | Robson | |
| 7,644,052 B1* | 1/2010 | Chang .................... | G06N 5/022 |
| | | | 706/45 |
| 7,849,030 B2* | 12/2010 | Ellingsworth ........ | G06F 16/313 |
| | | | 706/20 |
| 8,140,567 B2 | 3/2012 | Padovitz et al. | |

(Continued)

FOREIGN PATENT DOCUMENTS

JP    2005265967 A    9/2005

OTHER PUBLICATIONS

Kanagavalli et al., "Detecting and Resolving Spatial Ambiguity in Text Using Named Entity Extraction and Self Leraning Fuzzy Logic Techniques", http://arxiv.org/ftp/arxiv/papers/1303/1303.0445.pdf, last accessed on: Mar. 29, 2016.

(Continued)

*Primary Examiner* — Jean M Corrielus
(74) *Attorney, Agent, or Firm* — Pepper Hamilton LLP (57) ABSTRACT

This technology relates generally to data classification, and more particularly to system and method for classifying an input statement with respect to a small dataset. In one embodiment, a method is provided for classifying an input statement with respect to a small dataset. The method comprises receiving the input statement, extracting a plurality of input keywords from the input statement, computing a membership score for each of a plurality of category ontology trees based on the plurality of input keywords, and determining a classification of the input statement based on the membership score. The plurality of category ontology trees are derived from the small dataset and correspond to a plurality of classifications in the small dataset.

15 Claims, 4 Drawing Sheets

(56) References Cited

U.S. PATENT DOCUMENTS

| | | | |
|---|---|---|---|
| 8,255,347 B2* | 8/2012 | Ellingsworth | G06F 16/313 706/20 |
| 8,359,191 B2* | 1/2013 | Chen | G06F 16/367 704/9 |
| 8,489,523 B2* | 7/2013 | Wang | G06F 16/35 706/12 |
| 8,583,419 B2* | 11/2013 | Yasin | G06F 17/3071 704/9 |
| 8,738,552 B2* | 5/2014 | Ellingsworth | G06F 17/30616 706/20 |
| 8,751,218 B2 | 6/2014 | Dang et al. | |
| 8,782,051 B2* | 7/2014 | Chashchin | G06F 17/277 707/740 |
| 8,819,047 B2* | 8/2014 | Cucerzan | G06F 16/951 707/761 |
| 9,244,909 B2 | 1/2016 | Ng Tari et al. | |
| 9,262,509 B2* | 2/2016 | Harrison | G06F 17/30613 |
| 2004/0199505 A1* | 10/2004 | Calistri-Yeh | G06F 17/30731 |
| 2004/0243575 A1* | 12/2004 | Ohashi | G06F 16/907 |
| 2006/0282415 A1* | 12/2006 | Shibata | G06F 16/93 |
| 2007/0073533 A1 | 3/2007 | Thione et al. | |
| 2007/0174220 A1* | 7/2007 | Flinn | G06N 5/048 706/12 |
| 2007/0174255 A1 | 7/2007 | Sravanapudi et al. | |
| 2007/0271266 A1* | 11/2007 | Acharya | G06F 17/30598 |
| 2007/0282824 A1* | 12/2007 | Ellingsworth | G06F 16/313 |
| 2009/0112838 A1* | 4/2009 | Eggebraaten | G06F 16/367 |
| 2010/0114561 A1* | 5/2010 | Yasin | G06F 17/2715 704/9 |
| 2011/0047168 A1* | 2/2011 | Ellingsworth | G06F 16/313 707/749 |
| 2011/0196870 A1* | 8/2011 | Schmidtler | G06Q 10/10 707/737 |
| 2013/0138688 A1* | 5/2013 | Anderson | G06N 20/00 707/769 |
| 2013/0212111 A1* | 8/2013 | Chashchin | G06F 17/277 707/740 |
| 2013/0268519 A1* | 10/2013 | Cucerzan | G06F 16/951 707/723 |
| 2014/0032529 A1 | 1/2014 | Chang | |
| 2014/0201126 A1* | 7/2014 | Zadeh | G06K 9/627 706/52 |
| 2015/0106157 A1 | 4/2015 | Chang et al. | |
| 2015/0120738 A1* | 4/2015 | Srinivasan | G06F 16/285 707/739 |
| 2016/0378853 A1* | 12/2016 | Mohammad | G06F 17/30684 707/706 |

OTHER PUBLICATIONS

Nadeau et al., "A Survey of Named Entity Recognition and Classification", 1991-2006, pp. 1-20.

* cited by examiner

SYSTEM AND METHOD FOR CLASSIFYING DATA WITH RESPECT TO A SMALL DATASET

This application claims the benefit of Indian Patent Application Serial No. 201641010247, filed Mar. 23, 2016, which is hereby incorporated by reference in its entirety.

FIELD

This technology relates generally to data classification, and more particularly to systems and methods for classifying an input statement with respect to a small dataset.

BACKGROUND

Data classification is the process of sorting and categorizing data into various distinct classes or categories and is performed for various business or other objectives. For example, data classification is at the root of any machine learning implementation. The data has to be scrambled, structured, and mined to determine the hidden patterns. The knowledge of historical data and their categorization enables prediction of the category of any new data (e.g., problem statement, logged tickets, etc.).

Various algorithms such as LSI (Latent Semantic Indexing), SVM (Support Vector Machines) may be employed to perform data classification. However, these algorithms typically work on a large dataset (popularly called 'Big Data') where the number of data or records is huge, of the order of 1 million. In many scenarios, the trained data set will be very small as low as about 400 records to as high as about 50,000 records. Even with the best case scenario of having 50,000 records would not imply that the data has covered a maximum number of possible categories (e.g., a large number of possible issues that the customer encounters). As will be appreciated, any classification algorithm performs well only if it has been trained for as many data types with as much variance as possible. The performance of above mentioned algorithms has therefore been empirically proven to be non-satisfactory while working on a small dataset comprising of small number of data or records.

Further, a dataset is classified into various classes based on some parameters and any new data is categorized into one of those classes for further processing. The boundaries delineating these classes may be precise or imprecise. For the small dataset, the boundaries between the classes are typically imprecise. This is because the machine learning algorithm doesn't get to see enough variance of the data when the training dataset is small. In other words, the data in small dataset is not enough to create clear and precise boundaries. These imprecise boundaries lead to incorrect prediction, thereby reducing the model efficacy and classification accuracy. For example, because of these overlapping class boundaries, an incident ticket or a problem statement may be classified in multiple classes despite being closer to being in a particular class.

SUMMARY

In one embodiment, a method for classifying an input statement with respect to a small dataset is disclosed. In one example, the method comprises receiving the input statement. The method further comprises extracting a plurality of input keywords from the input statement. The method further comprises computing a membership score for each of a plurality of category ontology trees based on the plurality of input keywords. The plurality of category ontology trees are derived from the small dataset and correspond to a plurality of classifications in the small dataset. The method further comprises determining a classification of the input statement based on the membership score.

In one embodiment, a system for classifying an input statement with respect to a small dataset is disclosed. In one example, the system comprises at least one processor and a memory communicatively coupled to the at least one processor. The memory stores processor-executable instructions, which, on execution, cause the processor to receive the input statement. The processor-executable instructions, on execution, further cause the processor to extract a plurality of input keywords from the input statement. The processor-executable instructions, on execution, further cause the processor to compute a membership score for each of a plurality of category ontology trees based on the plurality of input keywords. The plurality of category ontology trees are derived from the small dataset and correspond to a plurality of classifications in the small dataset. The processor-executable instructions, on execution, further cause the processor to determine a classification of the input statement based on the membership score.

In one embodiment, a non-transitory computer-readable medium storing computer-executable instructions for classifying an input statement with respect to a small dataset is disclosed. In one example, the stored instructions, when executed by a processor, cause the processor to perform operations comprising receiving the input statement. The operations further comprise extracting a plurality of input keywords from the input statement. The operations further comprise computing a membership score for each of a plurality of category ontology trees based on the plurality of input keywords. The plurality of category ontology trees are derived from the small dataset and correspond to a plurality of classifications in the small dataset. The operations further comprise determining a classification of the input statement based on the membership score.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
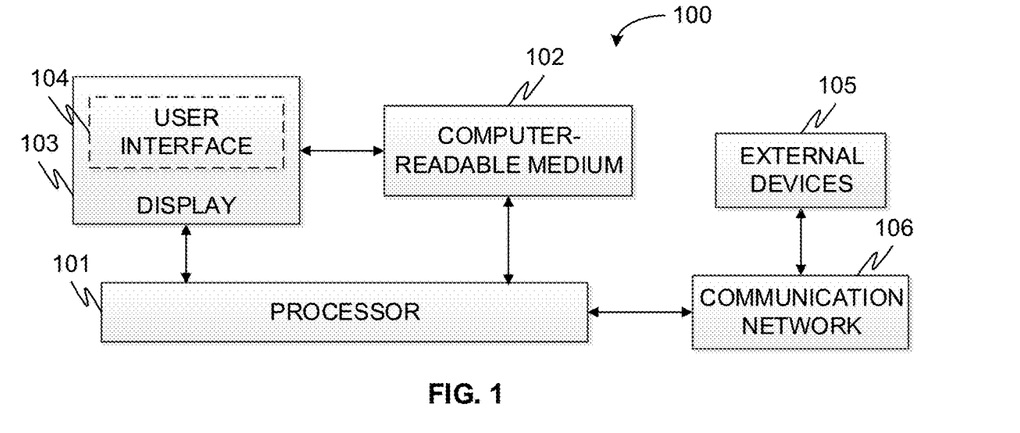
FIG. 1 is a block diagram of an exemplary system for classifying an input statement with respect to a small dataset in accordance with some embodiments of the present disclosure.

Referring now to FIG. 1, an exemplary system 100 for classifying an input statement with respect to a small dataset is illustrated in accordance with some embodiments of the present disclosure. In particular, the system 100 includes a category ontology trees (COTs) creation device (e.g., laptop, netbook, or any other computing device) that implements a COTs creation engine for deriving multiple COTs from the small dataset corresponding to multiple classifications in the small dataset. As will be described in greater detail in conjunction with FIG. 2, the COTs creation engine creates a data corpus from the small dataset, extracts keywords from the data corpus, clusters the keywords into multiple clusters, and stores each of the clusters in a vector space as COTs. The system 100 also includes a classification device (e.g., laptop, netbook, or any other computing device) that implements a classification engine for classifying the input statement with respect to the small dataset based on the COTs. As will be described in greater detail in conjunction with FIG. 2, the classification engine receives the input statement, extracts input keywords from the input statement, computes a membership score for each of multiple COTs based on the input keywords, and determines a classification of the input statement based on the membership score.

The system 100 comprises one or more processors 101, a computer-readable medium (e.g., a memory) 102, and a display 103. The computer-readable storage medium 102 stores instructions that, when executed by the one or more processors 101, cause the one or more processors 101 to create COTs from the small dataset and/or to classify the input statement with respect to the small dataset based on COTs in accordance with aspects of the present disclosure. The computer-readable storage medium 102 may also store various data (e.g., data corpus, keywords, COTs, input statement, membership score, result, etc.) that may be captured, processed, and/or required by the system 100. The system 100 interacts with a user via a user interface 104 accessible via the display 103. The system 100 may also interact with one or more external devices 105 over a communication network 106 for sending or receiving various data. The external devices 105 may include, but are not limited to, a remote server, a digital device, or another computing system.

Figure 2:
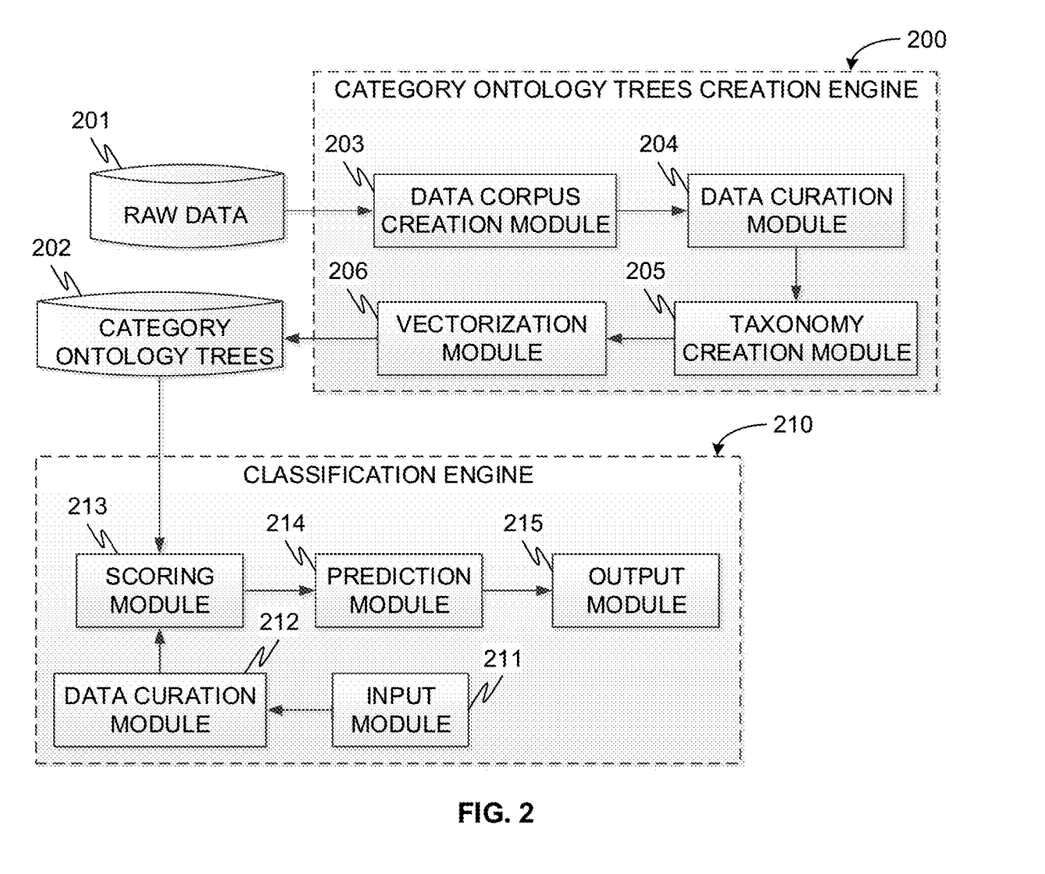
FIG. 2 is a functional block diagram of a category ontology trees creation engine and a classification engine in accordance with some embodiments of the present disclosure.

Referring now to FIG. 2, a functional block diagram of the COTs creation engine 200 and the classification engine 210 implemented by the system 100 of FIG. 1 is illustrated in accordance with some embodiments of the present disclosure. The COTs creation engine 200 receives input dataset from a raw data repository 201 and derives multiple COTs corresponding to multiple categories in the raw dataset. Thus, the output of the COTs creation engine 200 is a repository of COTs 202. The COTs creation engine 200 may include various modules that perform various functions so as to build the repository of the COTs 202 from the input dataset. In some embodiments, the COTs creation engine 200 comprises a data corpus creation module 203, a data curation module 204, a taxonomy creation or a clustering module 205, and a vectorization module 206.

As will be appreciated by those skilled in the art, the input dataset is a set of data or records that the system 100 needs to classify. For example, the input dataset may be incident tickets related to retail banking. Each of the ticket may include a summary of the ticket, a resolution status, a category of the ticket if known (e.g., ATM problem, hardware problem, etc.), or a resolution of the ticket. The input dataset is primarily unstructured or unformatted raw data that hasn't undergone thorough any manual or automatic processing and may also be referred to as primary data or training data. In some embodiments, the input dataset in the raw data repository 201 typically has about 400 records to about 50,000 records. For the sake of ease, such small dataset may be referred to as 'small data' in contrast to the term 'big data' commonly in use for referring to dataset with more than a million records. In some embodiments, COTs are created from the historical small dataset.

The data corpus creation module 203 acquires the small dataset from the raw data repository 201 and creates a data corpus from the small dataset. In some embodiments, the raw small dataset may reside in organization's relational database management system (RDBMS) and may be imported in csv format or similar other formats. As noted above, the small dataset may be unstructured or unformatted. The data corpus creation module 203 then converts this unstructured data (e.g., text) into structured data (i.e. data corpus) so as to enable any further text analysis. For example, the data acquired may be text, and may not be structured, so preprocessing may be required to convert it into structured format. The data corpus thus created may be a large and structured set of texts of documents.

Standard analytics-programming languages (e.g., R, Python, etc.) provide support to store data records in such a structured format. For example, R provides a text-mining (TM) package, which has a corpus function for performing such task. The corpus function accepts data in various formats such as vector source format, XML source format, data frame source format, URI source format, and so forth. In some embodiments, the data is provided in vector source formats as the resultant data corpus is stored in vector space.

Once the data corpus is created, the data curation module 204 curates the data. Thus, the data curation module 204 may perform pre-processing of the data corpus by stemming, removing stop words, standardizing, and so forth. For example, the data curation module 204 may convert all the characters to a common case (either upper case or lower case) as some of the standard analytics-programming languages may be case sensitive language. This would help the language differentiate between 'abc' and 'ABC'. Similarly, the data curation module 204 may normalize or standardize other data formats (e.g., normalizing all number formats). Further, the data curation module 204 may remove spaces (e.g., extra or redundant white spaces), punctuations, and stop words (e.g., commonly occurring words like a, an, the, is, was, etc.) as they add little or no value to overall analytics and may result in lower accuracy in subsequent classification if not removed. Further, the data curation module 204 may perform stemming where different forms of same words (e.g., trying/tried/try, device/devices, utilization/utilizes/utilizing, etc.) may be represented by one word or root of the word (e.g., try, device, utilization, etc.). It should be noted that pre-processing may also involve other text processing techniques. The TM (Text Mining) package in R provides an efficient way to perform all the above mentioned tasks via the tm_map and apply functions.

The taxonomy creation module 205 (also referred to as the clustering module 205) builds category-wise taxonomies from the data corpus. In some embodiments, the taxonomy creation module 205 extracts all the keywords from the curated data corpus and clusters the extracted keywords into a pre-defined number of clusters. Each of the clusters comprises a set of keywords from all the extracted keywords. It should be noted that some of the keywords may appear in multiple clusters. Each of these clusters forms a COT. In some embodiments, the taxonomy creation module 205 may employ a named entity extraction algorithm to achieve multi-class or multi-category clustering. Alternatively, in some embodiments, the taxonomy creation module 205 may employ any other algorithm for automatically identifying the related words from a set of documents to perform multi-class or multi-category clustering. For example, the taxonomy creation module 205 may employ K-Means clustering algorithm for clustering of the curated data corpus. It should be noted that the total number of classes/categories contained in the small data (i.e. K for K-Means clustering algorithm) may be pre-defined, or provided by a user, or otherwise determined from the categories provided in the training dataset. In the programming language R, the keywords extracted from the data corpus are provided for unsupervised clustering. The number of clusters depends on the number of labelled categories in the raw dataset. The K-Means clustering algorithm enables the analyst to specify the value of K before using the algorithm. The value of K may be the total number of classes/categories contained in the raw dataset.

The vectorization module 206 stores the resultant clusters as vectors in vector space. The vectorization module 206 performs vectorization by determining a vector representation for each of the keywords and by transforming all the clustered words in a separate vector space. In some embodiments, vectorization also involves determining Euclidean distance and Manhattan Distance between different words within a cluster so as to determine the hierarchy of the keywords. Thus, multiple structured hierarchical trees i.e., COTs are created corresponding to multiple clusters. It should be noted that each identified category within the raw dataset has a COT which is an individual hierarchical tree created for that class/category. The TM package in R provides method vector function to store the clustered data in vector space. As stated above, these multiple COTs are stored in a repository of COTs 202. The COTs creation engine builds COTs for various overlapping categories in the small data which may have common words. However, same concepts or keywords may be allowed to be part of more than one COTs. Further, it should be noted that the position of same concepts or keywords in different COTs may vary.

The classification engine 210 receives an input text or an input statement (e.g., a problem statement) and accurately classifies or categorizes the same with respect to the small data with the help of COTs. Thus, the classification engine 210 utilizes the output of COTs creation engine 200 which is a repository of COTs 202 corresponding to multiple categories identified in the small data that was provided as raw data to the COTs creation engine 200. The classification engine 210 may include various modules that perform various functions so as to classify an input text or statement with respect to the small dataset. In some embodiments, the classification engine 200 comprises an input module 211, a data curation module 212, a scoring module 213, a prediction 214, and an output module 215.

The input module 211 receives the input statement or text from a user or from another module or from another system. In one embodiment, the input statement may be a problem statement such as a new incident ticket that is to be categorized with respect to the small data. The data curation module 212 is similar to the data curation module 204 described above and curates the input statement. Thus, the data curation module 212 may perform pre-processing of the input statement by stemming, removing stop words, standardizing, and so forth. It should be noted that pre-processing may also involve other text processing techniques.

The curated input statement is provided to the scoring module 213 which computes a membership score for the input statement with respect to each of the categories with the help of corresponding COTs. In some embodiments, the scoring module 213 extracts input keywords from the input statement, and computes a membership score for each of the COTs based on the input keywords. The membership score is computed based on a presence and a position of each of the input keywords in each of the COTs. Thus, the scoring module 213 first determines whether the extracted words/concepts from the input text are present in a particular class's COT, and then computes a membership score for that COT based on their position in COT hierarchy. The scoring module 213 traverses through all the COTs and repeats the process for multi class classification.

In some embodiments, the membership score is computed based on a depth and a reachability of each of the plurality of input keywords in each of the plurality of category ontology trees, and a total number of keywords in each of the plurality of category ontology trees. In particular, as will be described in greater detail below, membership score is computed for a particular COT by first computing an actual coverage for each of the input keywords in the particular COT based on a path length from a tree-root and a number of missing words from the tree-root, then computing a sum of the actual coverage for all the input keywords in the particular COT, and finally computing the membership score for the particular COT based on the sum of the actual coverage and a total number of keywords in the particular COT. Further, in some embodiments, a weighted normalized membership score may be computed for each of the COTs.

The scoring module provides memberships scores for each of the COTs to the prediction module 214 which then determines or predicts one or more categories or classifications for the input statement. In some embodiments, the class corresponding to the COT having the highest membership score is predicted as the class to which the input statement belongs. The input statement is then assigned to that particular class. Alternatively, in some embodiments, the prediction module 214 provides predicted classes corresponding to COTs determined by applying a pre-defined threshold value on the membership score (e.g., all COTs having membership score above 70%) or by applying a pre-defined threshold value on a number of COTs sorted based on the membership score (e.g., top 3 COTs based on the membership score). The threshold value may be configured by the user. The one or more predicted classes may then be presented to the user by the output module 215.

As will be appreciated by those skilled in the art, all such aforementioned modules 203-206 and 211-215 may be represented as a single module or a combination of different modules. Further, as will be appreciated by those skilled in the art, each of the modules 203-206 and 211-215 may reside, in whole or in parts, on one device or multiple devices in communication with each other. For example, the modules 203-206 may reside on a first device for deriving COTs from the small data, while modules 211-215 may reside on a second device remote from but in communication with the first device for classifying an input statement based on the COTs derived by the first device.

Figure 3:
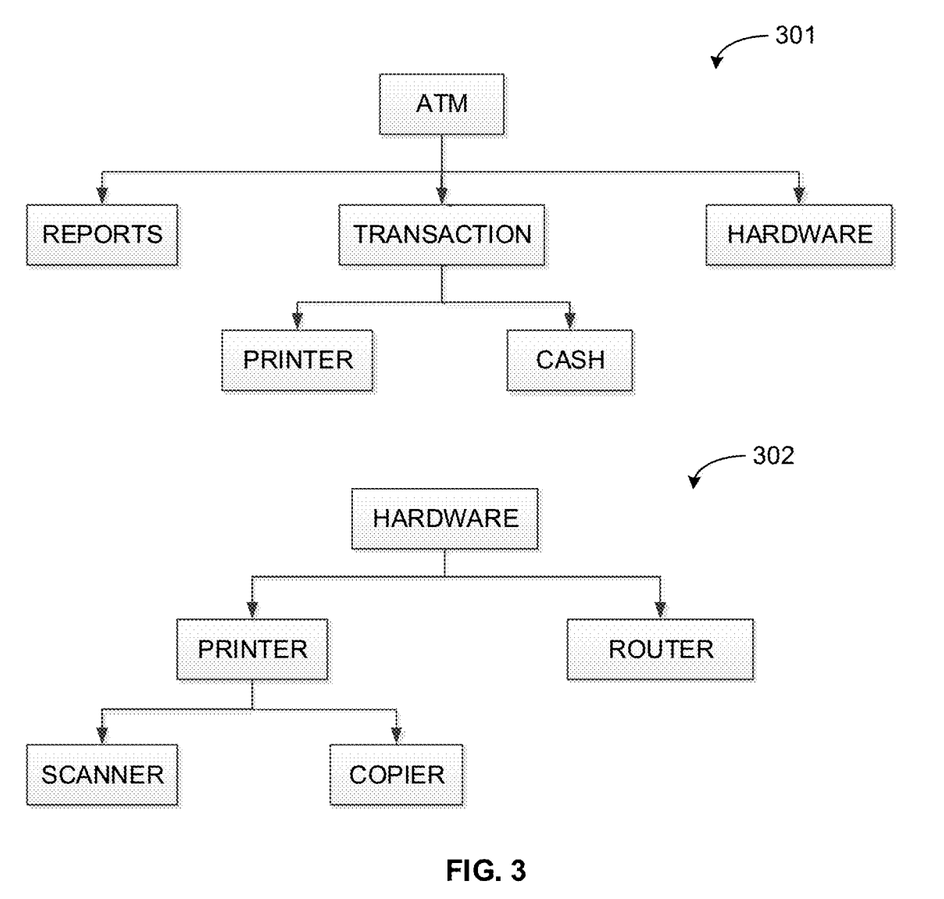
FIG. 3 depicts exemplary category ontology trees in accordance with some embodiments of the present disclosure.

Referring now to FIG. 3, an exemplary COT for ATM 301 and an exemplary COT for HARDWARE 302 are illustrated in accordance with some embodiments of the present disclosure. The COTs 301 and 302 may be derived from the raw small dataset via the COTs creation engine 200 as described above. The COTs 301 and 302 may then be employed by the classification engine 210 to classify an input statement with respect to the small dataset.

By way of an example, the classification engine 210 receives an input or problem statement as 'ATM Hardware printer not working' via the input module 211. The classification engine 210 may then curate the input statement via the data curation module 212 and remove the stop word 'not'. The classification engine 210 may then classify the input statement based on the COTs in the COTs repository via the scoring module 213 and the prediction module 214. The curated data is first provided to the scoring module 213. The scoring module 213 may then extract the input keywords (i.e., ATM, HARDWARE, and PRINTER) from the curated data and compute the membership score for each of the COTs (i.e., ATM COT 301 and the HARDWARE COT 302) in the repository of COTs 202. As discussed above, the membership score is computed based on the presence and the position of the input keywords in each of the COTs as follows:

missing Word (MW) indicates the number of missing nodes in the path of the desired node or keyword from the root node or keyword in the COT. For example, the path for PRINTER in the ATM COT is ATM-MW-PRINTER. The missing word is TRANSACTION. The Count of missing word is 1. The actual coverage or the reachability is the number of nodes in the path of the desired node which are in the problem statement and is provided as follows:

Actual coverage=Path length−number of Missing words

For example, the actual coverage or the reachability for PRINTER in the ATM COT is 2. It should be noted that if the membership score is above 100% in any case then the membership score will be considered as 100%. The prediction module 214 receives the scores of both the COTs and classifies the input statement as the one belonging to ATM as the ATM COT has higher membership score than the HARDWARE COT for the given input statement. The predicted class may then be presented to the user via the output module 215.

As will be appreciated by one skilled in the art, a variety of processes may be employed for classifying an input statement with respect to a small dataset. For example, the exemplary system 100 may classify the input statement with respect to the small dataset by the processes discussed herein. In particular, as will be appreciated by those of ordinary skill in the art, control logic and/or automated routines for performing the techniques and steps described herein may be implemented by the system 100, either by

TABLE A

ATM COT Membership Score for the Input Statement

| Token | Path | Path Length (PL) | Missing Word (MW) | Actual Coverage (AC) = PL − MW | Sum of Actual Coverage | Membership Score = Sum/ Total Keywords in COT |
|---|---|---|---|---|---|---|
| ATM | ATM | 1 | 0 | 1 | 1 + 2 + 2 = 5 | 5/6 = 84% |
| HARDWARE | ATM-HARDWARE | 2 | 0 | 2 | | |
| PRINTER | ATM-MW-PRINTER | 3 | 1 | 2 | | |

TABLE B

HARDWARE COT Membership Score for the Input Statement

| Token | Path | Path Length (PL) | Missing Word (MW) | Actual Coverage (AC) = PL − MW | Sum of Actual Coverage | Membership Score = Sum/ Total Keywords in COT |
|---|---|---|---|---|---|---|
| ATM | NA | 0 | 0 | 0 | 0 + 1 + 2 = 3 | 3/5 = 60% |
| HARDWARE | HARDWARE | 1 | 0 | 1 | | |
| PRINTER | HARDWARE-PRINTER | 2 | 0 | 2 | | |

The path is the way to desired node or keyword from the root node or keyword in the COT. The path length (PL) or the depth is the distance to desired node or keyword from the root node or keyword in the COT. For example, the path length or the depth for PRINTER is 3 in the ATM COT. The hardware, software, or combinations of hardware and software. For example, suitable code may be accessed and executed by the one or more processors on the system 100 to perform some or all of the techniques described herein. Similarly application specific integrated circuits (ASICs)

configured to perform some or all of the processes described herein may be included in the one or more processors on the system 100.

Figure 4:
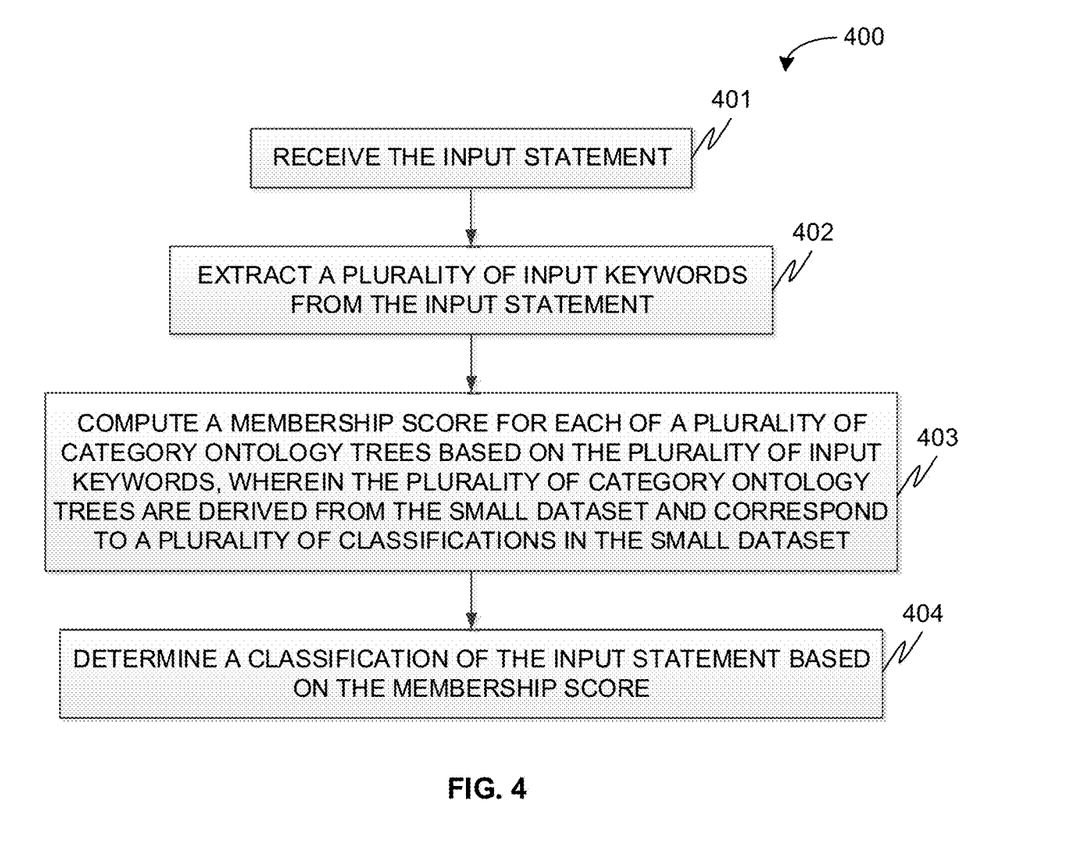
FIG. 4 is a flow diagram of an exemplary process for classifying an input statement with respect to a small dataset in accordance with some embodiments of the present disclosure.

For example, referring now to FIG. 4, exemplary control logic 400 for classifying an input statement with respect to a small dataset via a system, such as system 100, is depicted via a flowchart in accordance with some embodiments of the present disclosure. As illustrated in the flowchart, the control logic 400 includes the steps of receiving the input statement at step 401, extracting a plurality of input keywords from the input statement at step 402, and computing a membership score for each of a plurality of category ontology trees based on the plurality of input keywords at step 403. The plurality of category ontology trees are derived from the small dataset and correspond to a plurality of classifications in the small dataset. The control logic 400 further includes the step of determining a classification of the input statement based on the membership score at step 404. In some embodiments, the control logic 400 further includes the step of pre-processing the input statement for stemming, removing at least one stop word, or standardizing.

In some embodiments, computing the membership score at step 403 comprises computing a weighted normalized membership score for each of the plurality of category ontology trees. In some embodiments, computing the membership score at step 403 comprises computing the membership score for each of the plurality of category ontology trees based on a presence and a position of each of the plurality of input keywords in each of the plurality of category ontology trees. In some embodiments, computing the membership score at step 403 comprises computing the membership score for each of the plurality of category ontology trees based on a depth and a reachability of each of the plurality of input keywords in each of the plurality of category ontology trees, and a total number of keywords in each of the plurality of category ontology trees. In some embodiments, computing the membership score at step 403 comprises computing an actual coverage in each of the plurality of category ontology trees based on a path length from a tree-root and a number of missing words from the tree-root for each of the plurality of input keywords, computing a sum of the actual coverage for the plurality of input keywords in each of the plurality of category ontology trees, and computing the membership score for each of the plurality of category ontology trees based on the sum of the actual coverage and a total number of keywords in each of the plurality of category ontology trees.

In some embodiments, the control logic 400 may further include the step of deriving the plurality of category ontology trees from the small dataset by creating a data corpus from the small dataset by converting unstructured data in the small dataset to structured data, extracting a plurality of keywords from the data corpus, clustering the plurality of keywords into a pre-defined number of clusters using a named entity extraction algorithm wherein each of the clusters comprises a set of keywords, and storing each of the clusters in a vector space by determining a vector representation for each of the set of keywords. In some embodiments, the control logic 400 may further include the step of pre-processing the data corpus for stemming, removing at least one stop word, or standardizing.

In some embodiments, determining the classification at step 404 comprises determining a set of category ontology trees by applying a pre-defined threshold value on at least one of the membership score or a number of category ontology trees sorted based on the membership score. In some embodiments, determining the classification at step 404 further comprises identifying a classification to be presented to the user corresponding to each of the set of category ontology trees.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
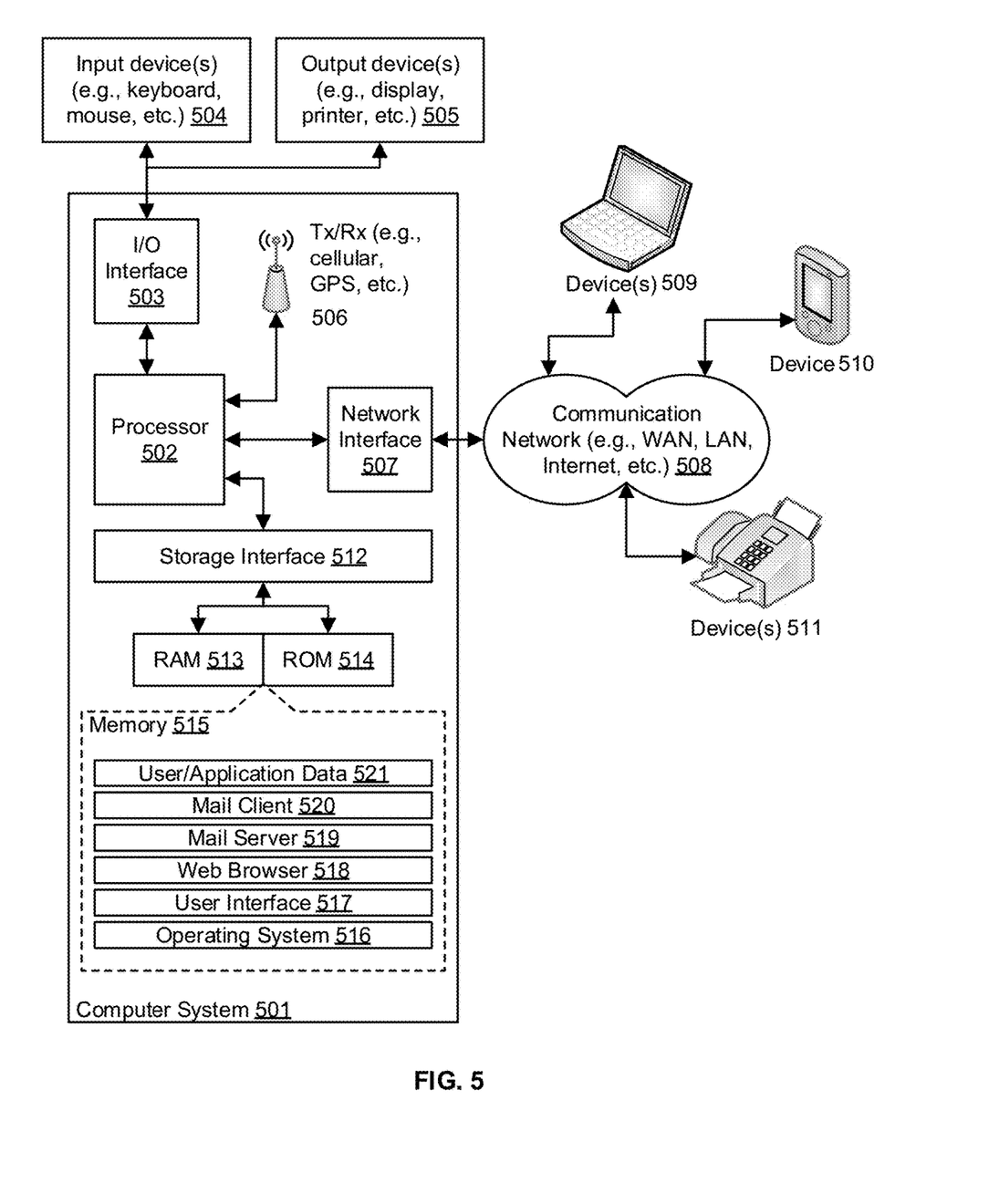
FIG. 5 is a block diagram of an exemplary computer system for implementing embodiments consistent with the present disclosure.

Referring now to FIG. 5, a block diagram of an exemplary computer system 501 for implementing embodiments consistent with the present disclosure is illustrated. Variations of computer system 501 may be used for implementing system 100 for classifying an input statement with respect to a small dataset. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasmoa, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., raw small dataset, data corpus, COTs, input statement, input keywords, membership scores, threshold values, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for an efficient and accurate classification of new data with respect to a small dataset. As stated above, the boundaries between potential categories or classes in the small dataset are imprecise and overlapping resulting in the classification of the new data into more than one category or class if normal big data techniques are applied. The techniques described in the various embodiments discussed above employ category ontology trees (COTs) and a membership scoring method based on depth and reachability of keywords in the COTs to create precise boundaries between various classes in the small dataset and to identify the most relevant category that an input statement may belong to with respect to the small dataset. The COTs creation process is automated using named entity extraction algorithm. Further, automated retraining of the COT enables to provide the accurate classification with new COTs. The techniques keep the annotations in the hierarchical structure for multi class classification.

Further, as will be appreciated by those skilled in the art, the classification techniques described in the various embodiments discussed above may be employed in any ticketing system that require accurate classification of the ticket but do not have sufficient data in the dataset. Moreover, the techniques described in the various embodiments discussed above works not only for small data, but also for big data.

The specification has described system and method for classifying an input statement with respect to a small dataset. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for classifying input statements with respect to small datasets, the method comprising:
    receiving, by a classification device, an input statement;
    extracting, by the classification device, a plurality of input keywords from the input statement;
    for each of the plurality of input keywords, computing, by the classification device, an actual coverage in each of a plurality of category ontology trees based on a path length from a tree-root and a number of missing words from the tree-root;
    computing, by the classification device, a sum of the actual coverage for the plurality of input keywords in each of the plurality of category ontology trees;
    computing, by the classification device, a membership score for each of the plurality of category ontology trees based on the sum of the actual coverage and a total number of keywords in each of the plurality of category ontology trees, wherein the plurality of category ontology trees is derived from a small dataset and corresponds to a plurality of classifications in the small dataset; and
    classifying, by the classification device, the input statement with respect to the small dataset based on the membership score and the plurality of category ontology trees.

2. The method of claim 1, further comprising pre-processing, by the classification device, the input statement for stemming, removing at least one stop word, or standardizing.

3. The method of claim 1, wherein computing the membership score further comprises at least one of:
    computing a weighted normalized membership score for each of the plurality of category ontology trees; or
    computing another membership score for each of the plurality of category ontology trees based on at least one of a presence, a position, a depth, or a reachability of each of the plurality of input keywords in each of the plurality of category ontology trees, or a total number of keywords in each of the plurality of category ontology trees.

4. The method of claim 1, further comprising deriving, by the classification device, the plurality of category ontology trees from the small dataset comprising:
    creating a data corpus from the small dataset by converting unstructured data in the small dataset to structured data;
    extracting a plurality of keywords from the data corpus;
    clustering the plurality of keywords into a pre-defined number of clusters using a named entity extraction algorithm, wherein each of the clusters comprises a set of keywords; and
    storing each of the clusters in a vector space by determining a vector representation for each of the set of keywords.

5. The method of claim 1, wherein classifying the input statement further comprises at least one of:
    determining a set of category ontology trees by applying a pre-defined threshold value on at least one of the membership score or a number of category ontology trees sorted based on the membership score; or
    identifying a classification to be presented to the user corresponding to each of the set of category ontology trees.

6. A classification device, comprising memory comprising programmed instructions stored in the memory and one or more processors configured to be capable of executing the programmed instructions stored in the memory to:
    receive an input statement;
    extract a plurality of input keywords from the input statement;
    for each of the plurality of input keywords, compute an actual coverage in each of a plurality of category ontology trees based on a path length from a tree-root and a number of missing words from the tree-root;
    compute a sum of the actual coverage for the plurality of input keywords in each of the plurality of category ontology trees; and
    compute a membership score for each of the plurality of category ontology trees based on the sum of the actual coverage and a total number of keywords in each of the plurality of category ontology trees, wherein the plurality of category ontology trees is derived from a small dataset and corresponds to a plurality of classifications in the small dataset; and classify the input statement with respect to the small dataset based on the membership score and the plurality of category ontology trees.

7. The classification device of claim 6, wherein the one or more processors are further configured to be capable of executing the programmed instructions stored in the memory to pre-process the input statement for stemming, removing at least one stop word, or standardizing.

8. The classification device of claim 6, wherein the one or more processors are further configured to be capable of executing the programmed instructions stored in the memory to:

compute a weighted normalized membership score for each of the plurality of category ontology trees; or compute another membership score for each of the plurality of category ontology trees based on at least one of a presence, a position, a depth, or a reachability of each of the plurality of input keywords in each of the plurality of category ontology trees, or a total number of keywords in each of the plurality of category ontology trees.

9. The classification device of claim 6, wherein the one or more processors are further configured to be capable of executing the programmed instructions stored in the memory to derive the plurality of category ontology trees from the small dataset comprising:

create a data corpus from the small dataset by converting unstructured data in the small dataset to structured data;

extract a plurality of keywords from the data corpus;

cluster the plurality of keywords into a pre-defined number of clusters using a named entity extraction algorithm, wherein each of the clusters comprises a set of keywords; and store each of the clusters in a vector space by determining a vector representation for each of the set of keywords.

10. The classification device of claim 6, wherein the one or more processors are further configured to be capable of executing the programmed instructions stored in the memory to:

determine a set of category ontology trees and apply a pre-defined threshold value on at least one of the membership score or a number of category ontology trees sorted based on the membership score; or identify a classification to be presented to the user corresponding to each of the set of category ontology trees.

11. A non-transitory computer readable medium having stored thereon instructions for classifying input statements with respect to small datasets comprising executable code which when executed by one or more processors, causes the processors to:

receive an input statement;

extract a plurality of input keywords from the input statement;

for each of the plurality of input keywords, compute an actual coverage in each of a plurality of category ontology trees based on a path length from a tree-root and a number of missing words from the tree-root;

compute a sum of the actual coverage for the plurality of input keywords in each of the plurality of category ontology trees; and compute a membership score for each of the plurality of category ontology trees based on the sum of the actual coverage and a total number of keywords in each of the plurality of category ontology trees, wherein the plurality of category ontology trees is derived from a small dataset and corresponds to a plurality of classifications in the small dataset; and classify the input statement with respect to the small dataset based on the membership score and the plurality of category ontology trees.

12. The non-transitory computer readable medium of claim 11, wherein the executable code when executed by the processors further causes the processors to pre-process the input statement for stemming, removing at least one stop word, or standardizing.

13. The non-transitory computer readable medium of claim 11, wherein the executable code when executed by the processors further causes the processors to:

compute a weighted normalized membership score for each of the plurality of category ontology trees; or compute another membership score for each of the plurality of category ontology trees based on at least one of a presence, a position, a depth, or a reachability of each of the plurality of input keywords in each of the plurality of category ontology trees, or a total number of keywords in each of the plurality of category ontology trees.

14. The non-transitory computer readable medium of claim 11, wherein the executable code when executed by the processors further causes the processors to derive the plurality of category ontology trees from the small dataset by:

creating a data corpus from the small dataset by converting unstructured data in the small dataset to structured data;

extracting a plurality of keywords from the data corpus;

clustering the plurality of keywords into a pre-defined number of clusters using a named entity extraction algorithm, wherein each of the clusters comprises a set of keywords; and storing each of the clusters in a vector space by determining a vector representation for each of the set of keywords.

15. The non-transitory computer readable medium of claim 11, wherein the executable code when executed by the processors causes the processors to:

determine a set of category ontology trees by applying a pre-defined threshold value on at least one of the membership score or a number of category ontology trees sorted based on the membership score; or identify a classification to be presented to the user corresponding to each of the set of category ontology trees.

* * * * *